(12) United States Patent
Cheong et al.

(10) Patent No.: US 10,091,506 B2
(45) Date of Patent: *Oct. 2, 2018

(54) DATA-CHARGE PHASE DATA COMPRESSION ARCHITECTURE

(71) Applicants: Hye-Yeon Cheong, Los Gatos, CA (US); Masaru Ikeda, San Jose, CA (US); Ali Tabatabai, Cupertino, CA (US)

(72) Inventors: Hye-Yeon Cheong, Los Gatos, CA (US); Masaru Ikeda, San Jose, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 14/736,631

(22) Filed: Jun. 11, 2015

(65) Prior Publication Data

US 2016/0366411 A1 Dec. 15, 2016

(51) Int. Cl.
| | |
|---|---|
| *G06T 9/00* | (2006.01) |
| *H04N 19/124* | (2014.01) |
| *H04N 19/13* | (2014.01) |
| *H04N 19/159* | (2014.01) |
| *H04N 19/176* | (2014.01) |
| *H04N 19/172* | (2014.01) |
| *H04N 19/129* | (2014.01) |
| *H04N 19/593* | (2014.01) |
| *H04N 19/11* | (2014.01) |
| *H04N 19/192* | (2014.01) |

(52) U.S. Cl.
CPC ........... *H04N 19/124* (2014.11); *H04N 19/11* (2014.11); *H04N 19/129* (2014.11); *H04N 19/13* (2014.11); *H04N 19/159* (2014.11); *H04N 19/172* (2014.11); *H04N 19/176* (2014.11); *H04N 19/593* (2014.11); *H04N 19/192* (2014.11)

(58) Field of Classification Search
CPC ......... H04N 19/50–19/597; G06T 9/00; G06T 9/004
See application file for complete search history.

(56) References Cited

U.S. PATENT DOCUMENTS

| | | | |
|---|---|---|---|
| 6,529,633 B1 * | 3/2003 | Easwar | G06T 9/00 358/462 |
| 6,763,139 B1 * | 7/2004 | Andrew | H04N 19/63 375/E7.04 |

(Continued)

FOREIGN PATENT DOCUMENTS

WO WO 2015044660 A1 * 4/2015 ........... H04N 19/159

*Primary Examiner* — Sean Motsinger

(74) *Attorney, Agent, or Firm* — Trellis IP Law Group, PC

(57) ABSTRACT

Implementations generally relate to data-charge phase data compression. In one implementation, a method includes computing prediction values for image data, where the image data is data-charge phase data, and where the computing of prediction values is based on inter-block prediction. The method also includes computing residual data based on the prediction values. The method also includes quantizing the residual data. The method also includes entropy encoding the quantized residual data. The method also includes refining an inverse quantized residual data based on one or more of the residual data and a number of left-over bit-budget after entropy encoding.

19 Claims, 10 Drawing Sheets

(56) References Cited

U.S. PATENT DOCUMENTS

| | | |
|---|---|---|
| 8,223,236 B2 | 7/2012 | Ostlund |
| 2011/0007979 A1 | 1/2011 | Goma |
| 2011/0280311 A1 | 11/2011 | Chen |
| 2012/0063517 A1* | 3/2012 | Choi .................. H04N 19/51 375/240.16 |
| 2012/0183234 A1* | 7/2012 | Liu .................... H04N 19/176 382/233 |
| 2012/0307906 A1* | 12/2012 | Kim ................... H04N 19/176 375/240.16 |
| 2013/0010864 A1* | 1/2013 | Teng ................... H04N 19/176 375/240.12 |
| 2013/0114733 A1* | 5/2013 | Fukui ................. H03M 7/3082 375/240.22 |
| 2014/0092986 A1* | 4/2014 | Chou ..................... H04N 7/50 375/240.25 |
| 2014/0355675 A1* | 12/2014 | He ..................... H04N 19/159 375/240.12 |
| 2014/0355768 A1* | 12/2014 | Sen .................... G10L 19/008 381/23 |
| 2016/0366410 A1* | 12/2016 | Cheong ............... H04N 19/124 |
| 2016/0366411 A1* | 12/2016 | Cheong ............... H04N 19/124 |
| 2016/0366429 A1* | 12/2016 | Cheong ............... H04N 19/176 |

\* cited by examiner

200

300

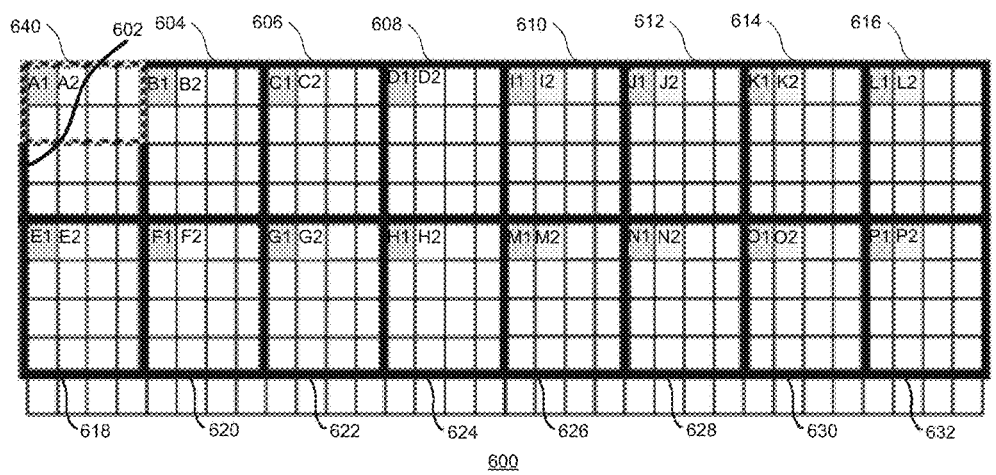

| AA0 AA1 AA2 | AB0 AB1 AB2 | AC0 AC1 AC2 | AD0 AD1 AD2 |
|---|---|---|---|
| AA3 AA4 AA5 | AB3 AB4 AB5 | AC3 AC4 AC5 | AD3 AD4 AD5 |
| AA6 AA7 AA8 | AB6 AB7 AB8 | AC6 AC7 AC8 | AD6 AD7 AD8 |
| BA0 BA1 BA2 | BB0 BB1 BB2 | BC0 BC1 BC2 | BD0 BD1 BD2 |
| BA3 BA4 BA5 | BB3 BB4 BB5 | BC3 BC4 BC5 | BD3 BD4 BD5 |
| BA6 BA7 BA8 | BB6 BB7 BB8 | BC6 BC7 BC8 | BD6 BD7 BD8 |
| CA0 CA1 CA2 | CB0 CB1 CB2 | CC0 CC1 CC2 | CD0 CD1 CD2 |
| CA3 CA4 CA5 | CB3 CB4 CB5 | CC3 CC4 CC5 | CD3 CD4 CD5 |
| CA6 CA7 CA8 | CB6 CB7 CB8 | CC6 CC7 CC8 | CD6 CD7 CD8 |

FIG. 9

| AA0 AA1 AA2 | AB0 AB1 AB2 | AC0 AC1 AC2 | AD0 AD1 AD2 |
|---|---|---|---|
| AA3 AA4 AA5 | AB3 AB4 AB5 | AC3 AC4 AC5 | AD3 AD4 AD5 |
| AA6 AA7 AA8 | AB6 AB7 AB8 | AC6 AC7 AC8 | AD6 AD7 AD8 |
| BA0 BA1 BA2 | BB0 BB1 BB2 | BC0 BC1 BC2 | BD0 BD1 BD2 |
| BA3 BA4 BA5 | BB3 BB4 BB5 | BC3 BC4 BC5 | BD3 BD4 BD5 |
| BA6 BA7 BA8 | BB6 BB7 BB8 | BC6 BC7 BC8 | BD6 BD7 BD8 |
| CA0 CA1 CA2 | CB0 CB1 CB2 | CC0 CC1 CC2 | CD0 CD1 CD2 |
| CA3 CA4 CA5 | CB3 CB4 CB5 | CC3 CC4 CC5 | CD3 CD4 CD5 |
| CA6 CA7 CA8 | CB6 CB7 CB8 | CC6 CC7 CC8 | CD6 CD7 CD8 |

FIG. 10

| AA0 | AB0 | AC0 | AD0 | AE0 | AF0 | AG0 | AH0 | AI0 | AJ0 | AK0 | AL0 |
|---|---|---|---|---|---|---|---|---|---|---|---|
| BA0 | BB0 | BC0 | BD0 | BE0 | BF0 | BG0 | BH0 | BI0 | BJ0 | BK0 | BL0 |
| CA0 | CB0 | CC0 | CD0 | CE0 | CF0 | CG0 | CH0 | CI0 | CJ0 | CK0 | CL0 |
| DA0 | DB0 | DC0 | DD0 | DE0 | DF0 | DG0 | DH0 | DI0 | DJ0 | DK0 | DL0 |
| EA0 | EB0 | EC0 | ED0 | EE0 | EF0 | EG0 | EH0 | EI0 | EJ0 | EK0 | EL0 |
| FA0 | FB0 | FC0 | FD0 | FE0 | FF0 | FG0 | FH0 | FI0 | FJ0 | FK0 | FL0 |
| GA0 | GB0 | GC0 | GD0 | GE0 | GF0 | GG0 | GH0 | GI0 | GJ0 | GK0 | GL0 |
| HA0 | HB0 | HC0 | HD0 | HE0 | HF0 | HG0 | HH0 | HI0 | HJ0 | HK0 | HL0 |

DATA-CHARGE PHASE DATA COMPRESSION ARCHITECTURE

BACKGROUND

Image sensors are widely used in devices such as a digital camera to produce digital images. An analog-to-digital converter (ADC) is used in an image sensor to convert analog signals into digital signals. More specifically, an ADC converts an analog pixel signal from a pixel array into digital data. Compressing techniques may be used to compress the digital data representing an image, as well as to preserve the quality of the image.

SUMMARY

Implementations generally relate to data-charge phase data compression and related to compression of image pixel data that is captured by an area analogue-to-digital (AD) sensor based on a predetermined output area AD coding or capturing order. In some implementations, an apparatus includes one or more processors, and includes logic encoded in one or more tangible media for execution by the one or more processors and when executed operable to perform operations including: computing prediction values for image data, where the image data is data-charge phase data, and where the computing of prediction values is based on inter-block prediction; computing residual data based on the prediction values; quantizing the residual data; entropy encoding the quantized residual data; and refining an inverse quantized residual data based on one or more of the residual data and a number of left-over bit-budget after entropy encoding.

In some implementations, software is encoded in one or more non-transitory computer-readable media for execution by the one or more processors. When executed, the software is operable to perform operations including: computing prediction values for image data, where the image data is data-charge phase data, and where the computing of prediction values is based on inter-block prediction; computing residual data based on the prediction values; quantizing the residual data; entropy encoding the quantized residual data; and refining an inverse quantized residual data based on one or more of the residual data and a number of left-over bit-budget after entropy encoding.

In some implementations, a method includes computing prediction values for image data, where the image data is data-charge phase data, and where the computing of prediction values is based on inter-block prediction. The method also includes computing residual data based on the prediction values. The method also includes quantizing the residual data. The method also includes entropy encoding the quantized residual data. The method also includes refining an inverse quantized residual data based on one or more of the residual data and a number of left-over bit-budget after entropy encoding.

A further understanding of the nature and the advantages of particular embodiments disclosed herein may be realized by reference of the remaining portions of the specification and the attached drawings.

BRIEF DESCRIPTION OF THE DRAWINGS

FIG. 6A illustrates a block diagram of example D-phase data, according to some implementations.

FIGS. 6B-6E illustrate block diagrams of example sub-sample coding blocks, according to some implementations.

FIG. 7A illustrates a block diagram of an example input picture, according to some implementations.

FIGS. 7B and 7C illustrate block diagrams of example sub-pictures, according to some implementations.

FIG. 8A illustrates a block diagram of an example input picture, according to some implementations.

FIGS. 8B and 8C illustrate block diagrams of example sub-pictures, according to some implementations.

FIG. 9 illustrates a block diagram of an example input picture, where the coding order is a raster order, according to some implementations.

FIG. 10 illustrates a block diagram of an example input picture, where the coding order is a zigzag order, according to some implementations.

FIG. 11 illustrates a block diagram of an example input picture, according to some implementations.

DETAILED DESCRIPTION OF EMBODIMENTS

Implementations generally relate to data-charge phase data compression. As described in more detail below, implementations employ inter-block prediction based techniques for data compression of data-charge phase (D-phase) data such as that of an area analogue-to-digital (AD) sensor. As described in more detail below, inter-block prediction involves dependency between blocks. Some implementations may also employ intra-block prediction.

In various implementations, an apparatus computes prediction values for image data, where the image data is data-charge phase data, and where the computing of prediction values is based on inter-block prediction. The apparatus also computes residual data based on the prediction values. The apparatus also quantizes the residual data. The apparatus also entropy encodes the quantized residual data. The apparatus also refines an inverse quantized residual data based on one or more of the residual data and a number of left-over bit-budget after entropy encoding. As a result, both subjective and objective performance improves compared to intra-prediction based techniques.

Figure 1:
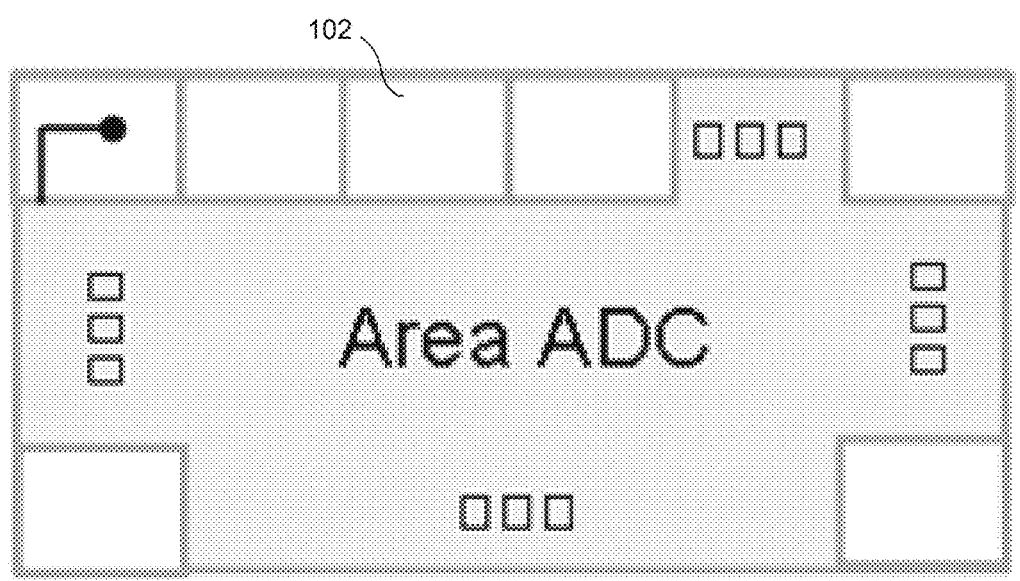
FIG. 1 illustrates a block diagram of an area analogue-to-digital converter (ADC), which may be used for implementations described herein.

FIG. 1 illustrates a block diagram of an area analogue-to-digital converter (ADC) 100, which may be used for implementations described herein. Area ADC 100 includes areas or blocks 102 of pixels, which generate pre-charge phase (P-phase) data and data-charge phase (P-phase) data.

In various implementations, area ADC 100 performs parallel processing in the blocks 102. For ease of illustration, blocks 102 are shown as squares. In various implementations, blocks 102 may be any shape such as rectangles, circles, etc.

In various implementations, the settling time for area ADC 100 may be significantly reduced, where the settling time may be the time for the sensor to reach a stable output once it is turned on. Such reduced settling times is beneficial for high-speed cameras.

Figure 2:
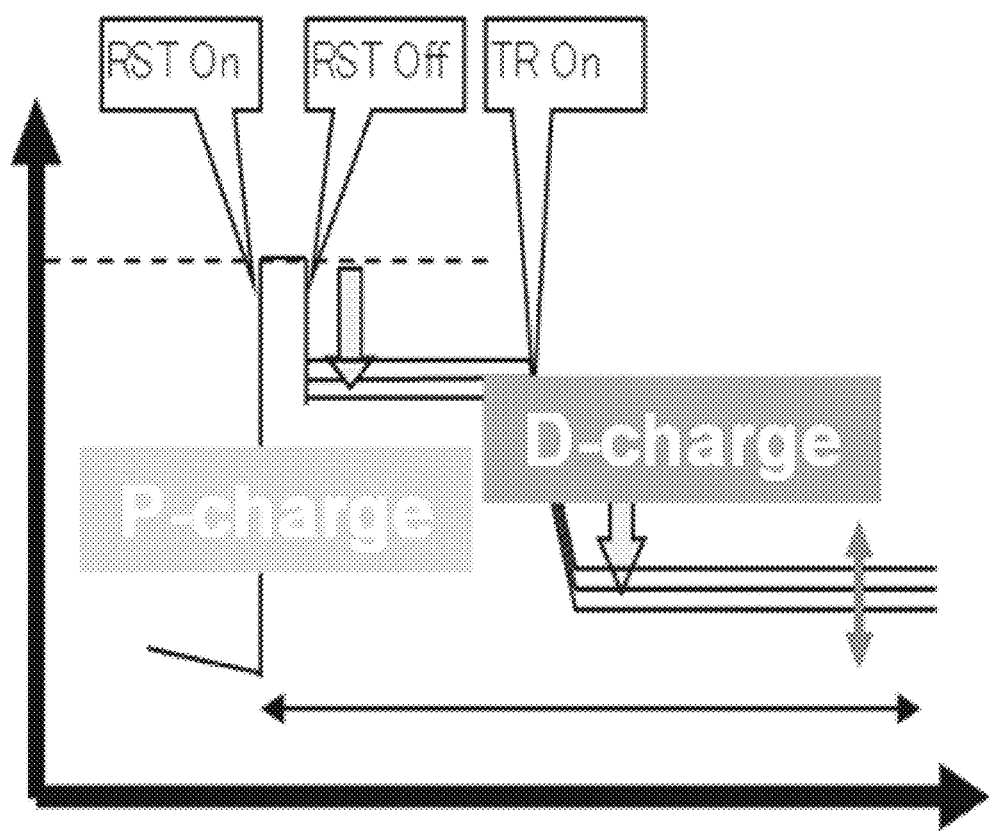
FIG. 2 illustrates an example graph diagram showing data from a correlated double sampling (CDS) based operation, according to some implementations.

FIG. 2 illustrates an example graph diagram 200 showing data from a correlated double sampling (CDS) based operation, according to some implementations. In various implementations, CDS-based operations involve both P-phase data and D-phase data. Area ADC 100 performs CDS as a noise reduction technique, in which CDS data is generated from the difference between the D-phase data and the P-phase data. The CDS data reflects the canceling of noise in an image.

From a codec point of view, area ADC 100 stores P-phase data, because the timing to obtain the P-phase data and the D-phase data is different. For example, area ADC 100 obtains and stores the P-phase data. When area ADC 100 obtains the D-phase data, ADC 100 may then fetch the P-phase data, and perform CDS in order to cancel noise. As described in more detail below, P-phase compression is desirable and is therefore performed.

Figure 3:
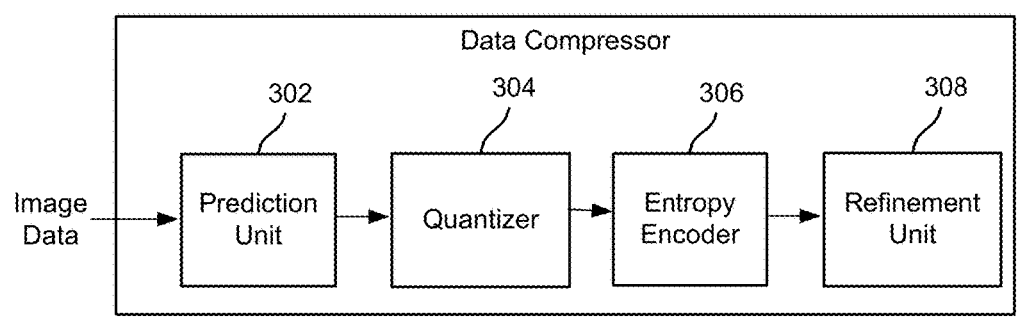
FIG. 3 is a block diagram of an example data compressor, according to some implementations.

FIG. 3 is a block diagram of an example data compressor 300, according to some implementations. In various implementations, data compressor 300 may be a part of area ADC of FIG. 1. As shown, data compressor 300 includes a prediction unit 302, a quantizer 304, an entropy encoder 306, and a refinement unit 308. Example implementations directed to operations of data compressor 300 are described in more detail below in connection with FIG. 4.

While implementations described herein may be described in the context of image data, these implementations and others also apply to non-image data. For example, P-phase data is primarily non-image data or noise. Implementations described herein may apply to compression P-phase data consisting of non-image data or noise, as well as to compression of D-phase data consisting of image data.

In various implementations, area ADC 100 may operate in two modes. The first mode, and simpler of the two modes, is referred to as pulse-code modulation (PCM). The second mode is referred to as differential pulse-code modulation (DPCM). In various implementations, a 1-bit signal (e.g., a 0 or 1 bit) indicates which mode to apply.

With regard to PCM mode, area ADC 100 sends each bit-plane in an order from the most significant bit (MSB) to least significant bit (LSB), until all of the bit-budget is used. In some implementations, area ADC 100 may perform middle point reconstruction of un-coded bits. In some implementations, PCM mode may be applied to a random access (RA) pixel array, where each block is randomly accessed. In other words, each block may be accessed independently, and independently encoded and/or decoded, where there are no dependencies on surrounding blocks.

In an example implementation, a given pixel block is an 8×1 block, or 8×1 pixels. The pixel block may be any size (e.g., 4×4, etc.). In this example, the block is 8×1 pixels. In this example, for each of 8 pixels, there is a 12-bit depth (bit plane). Each pixel is 12 bits and is to be compressed to 6 bits, but may be compressed to any other number of bits (e.g., 4 bits, etc.), depending on the particular implementation.

If there is a need to code from 12 bit depth to 6 bit depth, 8×12 or 96 bits per sample becomes 8×6 or 48 bits per sample. As a result, an 8×1 block would be coded with 48 bits (instead of 96 bits).

In some implementations, area ADC 100 first computes the bit budget. With a 48-bit budget, one bit is used for indicating PCM mode. As such, in this example, there remain 47 bits. Area ADC 100 then removes the header bit. Area ADC 100 then codes each block from MSB to LSB until the bit budget is used up. In some implementations, area ADC 100 then performs middle-point reconstruction in order to minimize errors.

Example implementations of the DPCM mode are described in more detail below in connection with FIG. 4.

Figure 4:
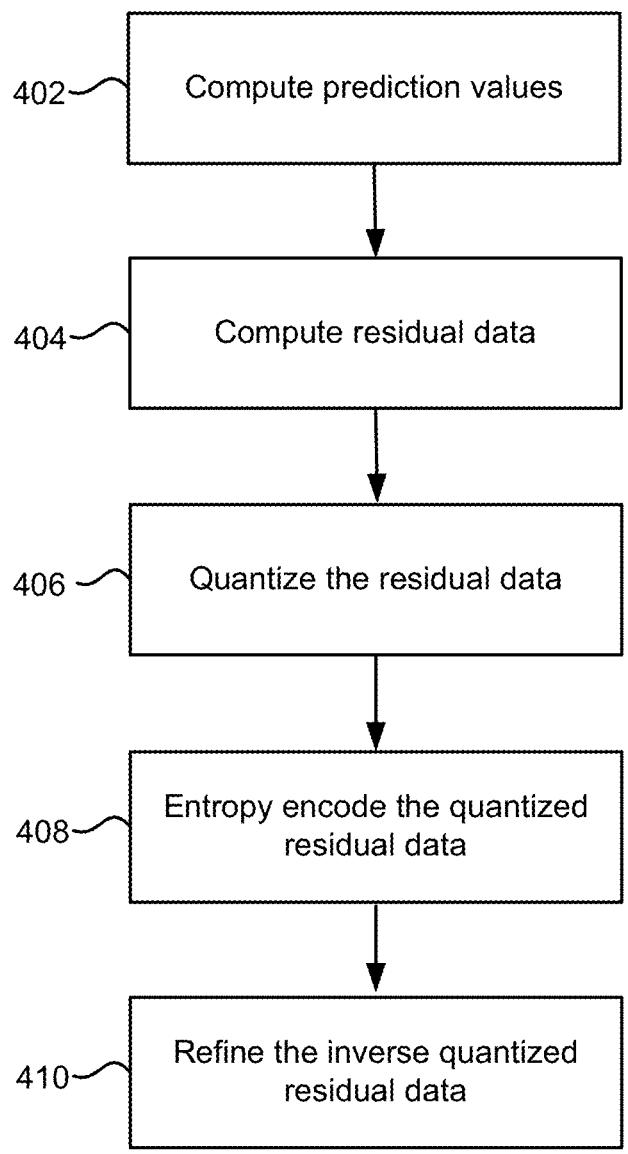
FIG. 4 illustrates an flow diagram of an example method for compressing image data, according to some implementations.

FIG. 4 illustrates an flow diagram of an example method for compressing image data, according to some implementations. Referring to both FIGS. 3 and 4, the method is initiated in block 402, where data compressor 300 computes prediction values for image data. In various implementations, the image data is data-charge phase data. The image data is partitioned into blocks, and data compressor 300 computes the prediction values for each block of the image data, and computes prediction values based on inter-block prediction. In other words, data compressor 300 computes the prediction values based on comparing samples of a first block to samples of a second block. In various implementations, inter-block prediction has an advantage of higher performance and may have a tradeoff of requiring larger random access units. In some implementations, data compressor 300 may computes prediction values based on intra-block prediction. In various implementations, intra-block prediction has an advantage of requiring smaller random access units and may have a tradeoff of lower performance.

As described in more detail below, in various implementations, the computing of prediction values is based on sample data in a same position in a different block. For example, the computing of prediction values may be based on sample data in a same position in a previous block.

Referring again to FIG. 4, in block 404, data compressor 300 computes residual data based on the prediction values.

In block 406, data compressor 300 quantizes the residual data. In various implementations, data compressor 300 quantizes the residual image data based on a quantization value. In various implementations, data compressor 300 determines the quantization parameter (qn) at the mode decision process sent in the bitstream. In some implementations, there are two possible techniques, which are described in more detail below.

With regard to the first technique, in some implementations, data compressor 300 selects a predetermined quantization value (qn). Various implementations are possible. For example, in some implementations the quantization value may be based on a predetermined bit-depth. In some implementations, data compressor 300 may select the quantization value from a set of quantization values ranging from a predetermined number (e.g., 0, 1, 2, etc.) to a predetermined bit-depth. For example, if the predetermined bit depth is 12, the quantization value can be 0 to 11 (12 possible quantization values). In another example implementation, the quantization value may be based on a Q step size of $2^n$, where n=1, 2, 3, 4, etc. In some implementations, there may be 4 bits to signal the quantization value in the header. Data compressor 300 tests for different quantization values.

With regard to the second technique, in some implementations, data compressor 300 selects the quantization value from one or more predetermined quantization values. Such quantization values may change depending on the particular implementation. The mode decision may compare these 2 predetermined quantization values. As such, this technique simplifies the mode decision process. Also, only 1 bit is needed to signal the quantization value in the header.

In block 408, data compressor 300 entropy encodes the quantized residual data. In some implementations, data compressor 300 performs entropy encoding based on Golomb coding (e.g., exponential-Golomb coding, progressive-Golomb coding, etc.). Other entropy coding may be used, depending on the particular implementation.

In block 410, data compressor 300 refines an inverse of the quantized residual data. In some implementations, data compressor 300 refines the inverse quantized residual data based on one or more of the residual data and a number of left-over bit-budget after entropy encoding.

Figure 5:
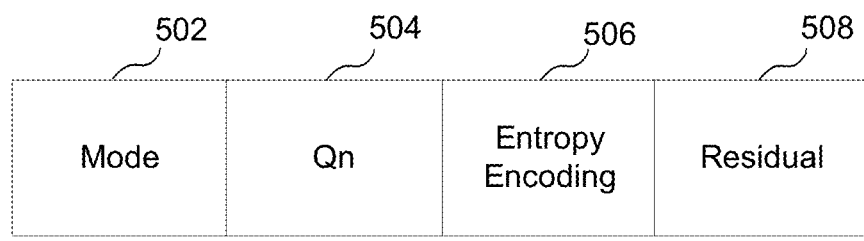
FIG. 5 illustrates an example bitstream structure, according to some implementations.

FIG. 5 illustrates an example bitstream structure 500, according to some implementations. In various implementations, bitstream structure 500 is used for DPCM mode, where various values described above are sent in the bitstream in bitstream structure 500. As shown, a mode field 502 (labeled "Mode") stores a 1-bit signal (e.g., 0 or 1) that indicates whether to use PCM or DPCM. A quantization field 504 (labeled "Qn") stores a quantization value. An entropy encoding field 506 stores entropy encoding values. A residual field 508 (labeled "Residual") stores residual data.

In various implementations, bitstream structure 500 is based on sub-sampled image data. Also, scan order may be variable, and a uniform scan is desirable between all areas.

While data compressor 300 is described as performing the steps as described in the implementations herein, any suitable component or combination of components of area ADC 100 or any suitable processor or processors associated with area ADC 100, and/or data compressor 300, and/or any suitable system may perform the steps described.

FIG. 6A illustrates a block diagram of example D-phase data 600, according to some implementations. In various implementations, D-phase data 600 is D-phase image data from an area ADC such as area ADC 100.

In various implementations, D-phase data 600 is basically the same as a raw Bayer image. Unlike P-phase data, D-phase data has a much higher dynamic range and there exists stronger spatial correlation. The primary differences of D-phase data 600 from raw Bayer include the following. Each block does not consist of consecutively neighboring samples of Bayer image. Also, as described in more detail below, each sample of a block belongs to different area. For example, an area the size may be 4×4, and the block size may be 4×2.

As shown, D-phase data 600 is partitioned into 4×4 areas 602, 604, 606, 608, 610, 612, 614, 616, 618, 620, 622, 624, 626, 628, 630, and 632 (indicated with bold lines). In this particular example, the size of each area is 4×4. Other sizes are possible (e.g., 6×6, 8×8, 10×10, etc.), depending on the particular implementation.

Each 4×4 area includes a coding block such as coding block 640 (indicated with dotted lines). In this particular example, the coding blocks are 4×2. Coding blocks of 4×2 are typical for Bayer image coding. Other sizes are possible (e.g., 4×4, 4×3, 4×1, etc.), depending on the particular implementation.

Each coding block has a predetermined number of samples. In this example, there are 8 samples. The particular number of samples per coding block will depend on the particular implementation.

Each coding block has associated sample positions. For example, coding block 640 has sample positions A1, A2, A3, A4, A5, A6, A7, and A8.

In various implementations, data compressor 100 separates D-phase data 600 into different sub-sample coding blocks based on the location of each sample in the original coding blocks. In this particular example, the sub-sample coding blocks are 4×2. Other sizes are possible (e.g., 4×4, 4×3, 4×1, etc.), depending on the particular implementation.

FIGS. 6B-6E illustrate block diagrams of example sub-sample coding blocks 650, 660, 670, and 680, according to some implementations.

As shown, in this particular implementation, there are four 4×2 sub-sample coding blocks 650, 660, 670, and 680. As shown, sub-sample coding block 650 includes the samples corresponding to A1, B1, C1, D1, E1, F1, G1, and H1. Because each sample of a given sub-sample block belongs to different areas of input picture 600, there is less correlation. Even though there is less correlation, data compressor 300 may still compress the D-phase data based on inter-block predictions.

As a result, the computing of prediction values is based on sample data in a same position in a different coding block. For example, the computing of prediction values may be based on sample data in a same position in a previous block.

As shown, sub-sample coding block 660 includes the samples corresponding to A2, B2, C2, D2, E2, F2, G2, and H2.

As shown, sub-sample coding block 670 includes the samples corresponding to I1, J1, K1, L1, M1, N1, O1, and P1.

As shown, sub-sample coding block 680 includes the samples corresponding to I2, J2, K2, L2, M2, N2, O2, and P2.

In various implementations, data compressor 300 encodes all of the pixels in a given sub-sample block independently. For example, data compressor 300 may encode all of the pixels in sub-sample block 650, then sub-sample block 660, then sub-sample block 670, and then sub-sample block 680. Then actual order may vary and will depend on the particular implementation.

Because Area ADC coding block consists of sub-sampled data, spatial correlation is much less within a block compared to conventional coding block with consecutive samples. Thus, this makes the DPCM mode less effective if intra-prediction (samples predicted from samples within the same block) is used.

As indicated above, implementations described herein support both PCM mode and DPCM mode. Implementations enable access to neighboring blocks for the prediction for DPCM mode. In some implementations, some of these techniques may require extra memory to store other blocks. Also, a random access unit may become bigger.

Figures 7A, 7B, 7C:
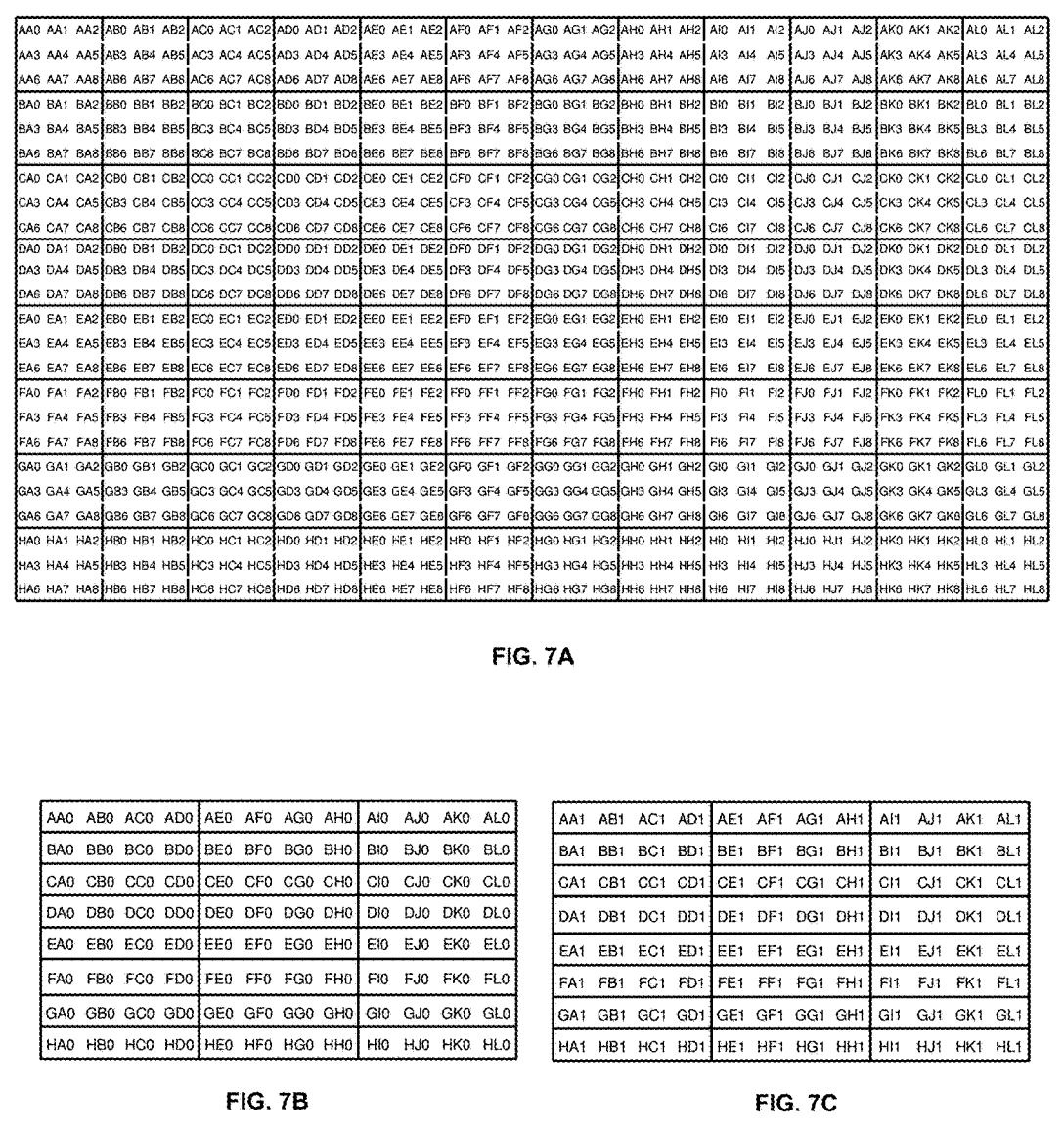

FIG. 7A illustrates a block diagram of an example input picture 700, according to some implementations. Input picture 700 includes D-phase data. As shown, input picture 700 has a picture size of 36×24, an area ADC size of 3×3, and an embedded block coding (EBC) block size of 4×1. In some implementations, there is a single color format (not R, Gr, Gb, B colors to simplify the illustration).

FIGS. 7B and 7C illustrate block diagrams of example sub-pictures 710 and 720, according to some implementations. Each sub-picture 710 and 720 has 24 blocks having a block size of 4×1. In various implementations, the samples each of sub-picture 710 and 720 are based on the positions in input picture 700

Figures 8A, 8B, 8C:
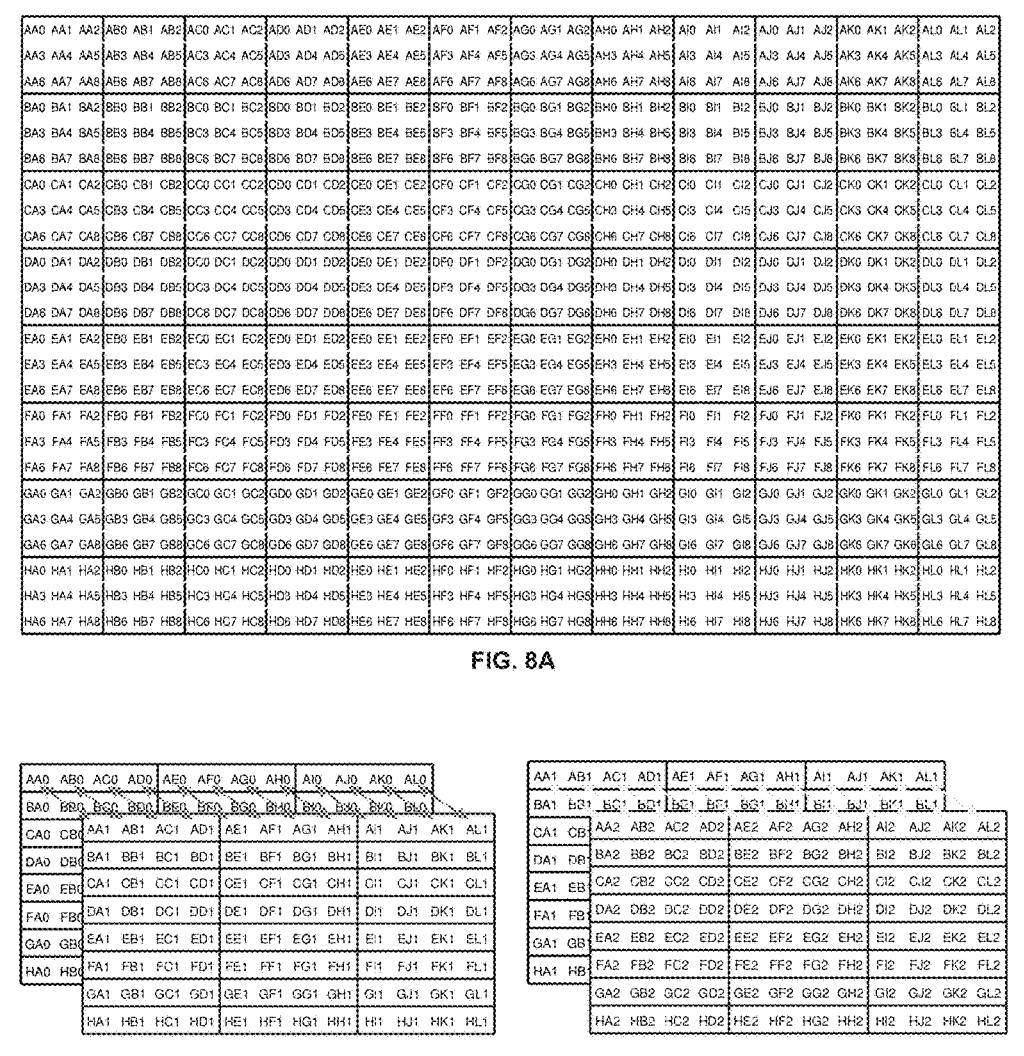

FIG. 8A illustrates a block diagram of an example input picture 800, according to some implementations. In this example implementation, input picture 800 is the same as input picture 700 of FIG. 7A.

FIGS. 8B and 8C illustrate block diagrams of example sub-pictures 810 and 820, according to some implementations. In this example implementation, sub-pictures 810 and 820 are the same as sub-pictures 710 and 720 of FIG. 7B.

Also shown is a sub-picture 830. In various implementations, the predictor of a current sample is the sample at the same position in previous block or sub-picture. In other words, inter-block prediction is used, where the predictor is from a different block. For example, as shown in FIG. 8B, sub-picture 720 is used to predict sub-picture 710. Also, as shown in FIG. 8C, sub-picture 720 is used to predict sub-picture 730. In some implementations, extra memory may be used to store sub-pictures.

In various implementations, the coding order may be fixed, block, or frame level adaptive. Various coding orders are possible depending on the particular implementations.

FIG. 9 illustrates a block diagram of an example input picture 900 where the coding order is a raster order, according to some implementations. As shown, in some implementations, the coding order is a raster order. In this example implementation, the random access unit size is smaller (indicated with a bold rectangle). Also, sub-picture 0, sub-picture 3, sub-picture 6 (indicated with bold arrows) are all intra-prediction coded (yellow samples).

FIG. 10 illustrates a block diagram of an example input picture 1000 where the coding order is a zigzag order, according to some implementations. As shown, in some implementations, the coding order is a zigzag order. In this example implementation, the random access unit size is bigger (indicated with a bold rectangle). Also, only sub-Picture 0 is all intra-prediction coded (yellow samples). Both objective and subjective performance are better than raster order.

FIG. 11 illustrates a block diagram of an example sub-picture 1100, according to some implementations.

Figure 12:
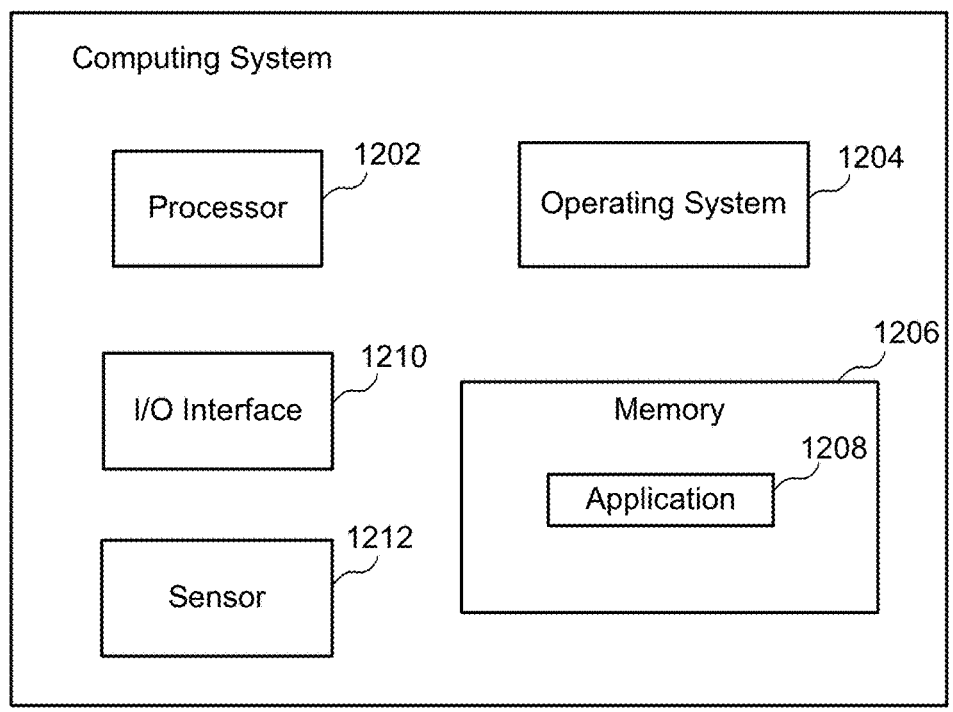
FIG. 12 illustrates a block diagram of an example computing system, which may be used for implementations described herein.

FIG. 12 is a block diagram of an example computing system 1200, which may be used for implementations described herein. For example, computing system 1200 may be used to implement area ADC 100 of FIG. 1 or any other associated devices. In some implementations, computing system 1200 may include a processor 1202, an operating system 1204, a memory 1206, an input/output (I/O) interface 1210, and sensor 1212. A software application 1208 may be stored on memory 1206 or on any other suitable storage location or computer-readable medium. Software application 1208 provides instructions that enable processor 1202 to perform the functions described herein. In other embodiments, computing system 1200 may not have all of the components listed and/or may have other components instead of, or in addition to, those listed above. The components of computing system 1200 may be implemented by one or more processors or any combination of hardware devices, as well as any combination of hardware, software, firmware, etc.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus comprising:
   one or more processors; and
   logic encoded in one or more tangible media for execution by the one or more processors and when executed operable to perform operations including:
   computing prediction values for image data, wherein the image data is data-charge phase data or image data that is captured by an area analogue-to-digital (AD) sensor and based on a predetermined coding order, and wherein the computing of the prediction values comprises:
partitioning the image data into coding blocks, wherein each coding block includes a predetermined number of image data samples, and wherein the image data samples are associated with respective sample positions;
generating sub-sample coding blocks, wherein a first sub-sample coding block of the sub-sample coding blocks includes a first portion of the image data samples based on the sample positions, and wherein the computing of the compressed bitstream is based on inter-block prediction; and
computing the prediction values for each coding block of the image data based on the sub-sample coding blocks;
computing residual data based on the prediction values, wherein the computing of the residual data comprises:
quantizing the residual data; and
refining an inverse quantized residual data based on the residual data and a number of left-over bit-budget after entropy encoding.

2. The apparatus of claim 1, wherein the computing of the prediction values is based on sample data in a same position in a different sub-sample coding block.

3. The apparatus of claim 1, wherein the computing of the prediction values is based on sample data in a same position in a previous sub-sample coding block.

4. The apparatus of claim 1, wherein the computing of the prediction values comprises computing the prediction values based on comparing samples of a first sub-sample coding block to samples of a second sub-sample coding block.

5. The apparatus of claim 1, wherein the predetermined coding order is a raster order.

6. The apparatus of claim 1, wherein the predetermined coding order is a zigzag order.

7. Software encoded in one or more non-transitory computer-readable media for execution by one or more processors and when executed operable to perform operations comprising:
computing prediction values for image data, wherein the image data is data-charge phase data or image data that is captured by an area analogue-to-digital (AD) sensor and based on a predetermined coding order, and wherein the computing of the prediction values comprises:
partitioning the image data into coding blocks, wherein each coding block includes a predetermined number of image data samples, and wherein the image data samples are associated with respective sample positions;
generating sub-sample coding blocks, wherein a first sub-sample coding block of the sub-sample coding blocks includes a first portion of the image data samples based on the sample positions, and wherein the computing of the compressed bitstream is based on inter-block prediction; and
computing the prediction values for each coding block of the image data based on the sub-sample coding blocks;
computing residual data based on the prediction values, wherein the computing of the residual data comprises:
quantizing the residual data; and
refining an inverse quantized residual data based on the residual data and a number of left-over bit-budget after entropy encoding.

8. The software of claim 7, wherein the computing of the prediction values is based on sample data in a same position in a different sub-sample coding block.

9. The software of claim 7, wherein the computing of the prediction values is based on sample data in a same position in a previous sub-sample coding block.

10. The software of claim 7, wherein the computing of the prediction values comprises computing the prediction values based on comparing samples of a first sub-sample coding block to samples of a second sub-sample coding block.

11. The software of claim 7, wherein the predetermined coding order is fixed.

12. The software of claim 7, wherein the predetermined coding order is a raster order.

13. The software of claim 7, wherein the predetermined coding order is a zigzag order.

14. A computer-implemented method comprising:
computing prediction values for image data, wherein the image data is data-charge phase data or image data that is captured by an area analogue-to-digital (AD) sensor and based on a predetermined coding order, and wherein the computing of the prediction values comprises:
partitioning the image data into coding blocks, wherein each coding block includes a predetermined number of image data samples, and wherein the image data samples are associated with respective sample positions;
generating sub-sample coding blocks, wherein a first sub-sample coding block of the sub-sample coding blocks includes a first portion of the image data samples based on the sample positions, and wherein the computing of the compressed bitstream is based on inter-block prediction; and
computing the prediction values for each coding block of the image data based on the sub-sample coding blocks;
computing residual data based on the prediction values, wherein the computing of the residual data comprises:
quantizing the residual data; and
refining an inverse quantized residual data based on the residual data and a number of left-over bit-budget after entropy encoding.

15. The method of claim 14, wherein the computing of the prediction values is based on sample data in a same position in a different sub-sample coding block.

16. The method of claim 14, wherein the computing of the prediction values is based on sample data in a same position in a previous sub-sample coding block.

17. The method of claim 14, wherein the computing of the prediction values is based on comparing samples of a first sub-sample coding block to samples of a second sub-sample coding block.

18. The method of claim 14, wherein the predetermined coding order is fixed.

19. The method of claim 14, wherein the predetermined coding order is a raster order.

* * * * *